(12) United States Patent
Hamel

(10) Patent No.: US 9,663,166 B2
(45) Date of Patent: May 30, 2017

(54) BICYCLE SEAT WITH ADJUSTABLE NOSE

(71) Applicant: Michael Raymond Hamel, Courtice (CA)

(72) Inventor: Michael Raymond Hamel, Courtice (CA)

( * ) Notice: Subject to any disclaimer, the term of this patent is extended or adjusted under 35 U.S.C. 154(b) by 0 days.

(21) Appl. No.: 14/845,393

(22) Filed: Sep. 4, 2015

(65) Prior Publication Data
US 2016/0068212 A1    Mar. 10, 2016

Related U.S. Application Data

(60) Provisional application No. 62/046,575, filed on Sep. 5, 2014.

(51) Int. Cl.
*B62J 1/00*    (2006.01)
(52) U.S. Cl.
CPC ..................... *B62J 1/007* (2013.01)
(58) Field of Classification Search
CPC ... B62J 1/002; B62J 1/005; B62J 1/007; B62J 1/10
See application file for complete search history.

(56) References Cited

U.S. PATENT DOCUMENTS

| | | | | |
|---|---|---|---|---|
| 4,512,608 A | * | 4/1985 | Erani | B62J 1/002 297/195.12 |
| 5,203,606 A | * | 4/1993 | Granzotto | B62J 1/00 297/201 |
| 6,575,529 B1 | * | 6/2003 | Yu | B62J 1/10 297/201 |
| 6,827,397 B1 | * | 12/2004 | Driver | B62J 1/10 297/215.14 |
| 7,500,717 B2 | * | 3/2009 | Bigolin | B62J 1/005 297/201 |
| 2014/0035332 A1 | * | 2/2014 | Winefordner | B62J 1/00 297/204 |

* cited by examiner

*Primary Examiner* — Philip Gabler
(74) *Attorney, Agent, or Firm* — Nasser Ashgriz; UIPatent Inc.

(57) ABSTRACT

An extendable nose bicycle seat allowing a rider to adjust seat nose length while riding for optimal comfort, performance, safety and style. Unlike any other bicycle seat, the adjustable seat nose embraces nose, cut-out and nose-less technology allowing the rider to leverage the strengths of each for the appropriate riding conditions. A sliding track system allows the rider to adjust the seat nose length for nose-less riding (zero contact with soft tissue areas) or alternatively to engage the nose for performance riding, like aggressive turning, racing or trail riding. Riders can adjust the nose while riding to pre-set lengths by pushing or pulling the nose in or out to activate pressure sensitive click and lock system.

6 Claims, 9 Drawing Sheets

BICYCLE SEAT WITH ADJUSTABLE NOSE

RELATED APPLICATION

The present application claims the priority date of provisional patent application No. 62/046,575 filed Sep. 5, 2014.

FIELD OF THE INVENTION

The present invention relates generally to bicycles and specifically to bicycle seats or saddles.

BACKGROUND OF THE INVENTION

Since the introduction of the bicycle, riders at all levels have struggled to varying degrees with bicycle seat/saddle comfort. There is growing scientific evidence traditional bicycle saddles create pressure points which place pressure on the prostate, irritate the urethra and can damage the pudendal arteries and dorsal nerves.

Although bicycle seat technology has evolved, the traditional bicycle seat continues to offer the same basic function and form. In recent years, nose-less, cut-out and hybrid split nose saddles have evolved to help reduce pressure and pain but typically require performance and design aesthetic trade-offs that have limited broad market acceptance.

No-nose (nose-less) design provides a sit bone area only with essentially zero contact on the genitals. Key focus on weight distribution with a larger sit area to accommodate range of body sizes. Typically an aesthetic and performance trade off to fully eliminate pressure issue.

Cut out and hybrid split nose seats designs offer a nose and focus on reducing pressure. Seats in this segment view the nose as a critical feature for optimal fit, safety and performance. Design seeks to maintain aesthetics and alignment with traditional nose design to maintain acceptance and credibility and views cut out cavity or split nose design as sufficient to relieve pressure at levels that are acceptable for most advanced bikers.

Problems associated with nose-less, cut-out and hybrid split nose designs include the following:

Concerns for lost control and performance without a nose to "lock you into the saddle" i.e. hard turning, off-road trail riding etc.;

Nose-less seats can cause "pelvic float" and inner thigh chafing—perception nose required to stabilize and prevent shifting on seat;

Nose-less design requires a more "up-right" stance and therefore not practical for racing stance or low grip handle bar positions;

Hybrid versions with a cut out and or a split nose system offers relief and most closely resembles a traditional seat—although less pressure, design still forces direct pressure on genitals while in sitting position; and For many, nose-less and hybrid designs are viewed as awkward looking. Long standing paradigm with "serious" bikers that tie to "norms and etiquette"—if you want to fit in, get a serious bike and stay clear of non-standard gear.

SUMMARY OF THE INVENTION

An extendable nose bicycle seat comprising of a nose-less seat shell having a central opening; a slidable nose slidable inside said opening; a sit-pad frame to support said seat; a sliding means to extend and retract said slidable nose through said shell; and a plurality of seat-rails attached to said sit-pad frame to connect said seat to a seat-post, whereby the length of the slidable nose is changed while riding, extending the length of the slidable nose for aggressive turning, racing or trail riding and reducing the length of the slidable nose when cruising for comfort and zero contact with pudendal arteries, prostate and tailbone of a rider.

The present invention is a bike saddle that allows users to adjust seat nose configurations for optimal comfort, performance, safety and style. Unlike any other bike saddle, the saddle embraces both the nose and the nose less technology allowing the rider to leverage the strengths of each for the appropriate riding conditions.

The present invention provides two styles to accommodate racing/competitive riders wanting a more firm, narrow and sleek design and a second design offering a softer wider sit bone area for casual or heavier set riders.

The adjustable seat nose design offers an adaptive bicycle seat that allows the rider to adjust seat nose configurations for optimal comfort, performance, safety and style. Unlike any other bicycle seat, the adjustable seat nose embraces nose, cut-out, sit pad elevation and nose-less technology allowing the rider to leverage the strengths of each for the appropriate riding conditions so riders can select two different settings for the bike saddle.

Cruise setting in the present invention has no nose riding for optimal comfort and zero contact with pudendal arteries, prostate and tailbone. Ideal for cruising, touring or taking a break from performance mode without having to pause or stop your ride.

The performance setting in the present invention has the nose pulled out to engage the nose for performance riding, i.e. aggressive turning, racing or trail riding. The cut-away slot and ⅜" seat pad elevation minimizes soft tissue pressure. Riders also have the option of partially engaging the nose by selecting one of three nose lengths that are auto-set by the pushing nose in or out to activate the pressure sensitive click and lock system.

A key feature of the adjustable seat nose is a sliding track system that allows the rider to adjust the seat nose length for various riding conditions (racing, hard turning or casual/cruise riding). The nose can be adjusted and locked into one of three positions (1) Fully engaged—maximum length (2) Mid-range—half length (3) Fully recessed—all the way inside the seat (cruise setting).

The adjustable seat nose design provides a level of customization that allows the rider to adapt to varying riding conditions—riders can enjoy the benefits of nose, nose-less, cut-away and elevated sit pack technology without having to sacrifice performance, style, comfort or safety.

The adjustable seat nose design is the only bike seat that addresses the trade-off between performance, style, comfort and safety in problem with existing seat technology. The adjustable seat nose design is beneficial for all frequent riders.

Current seat technology focuses on either nose-less solutions or nose seats that reduce pressure—to date no evidence of a solution that embraces multiple technologies.

The aforementioned objects of the present invention are attained by a bicycle seat/saddle that allows users to adjust seat nose configurations during a ride for optimal comfort, performance, safety and style. Other objects, advantages and novel features of the present invention will become readily apparent from the following drawings and detailed description of preferred embodiments.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF PREFERRED EMBODIMENTS

As shown in FIGS. 1-4, a bicycle seat 10 is attached to the seat-post which is a tube that extends upwards from the bicycle frame to the seat. The height of the seat/saddle can be adjusted by the seat-post telescoping in and out of the seat tube. The shell of the bicycle seat creates the shape of the bicycle seat; most modern seats have a hard shell made from a molded piece of plastic, such as nylon or carbon fiber. The rails 16-17 of a bicycle seat 10 are the connection point to the rest of the bicycle. The rails 16-17 run along the underside of the seat 10 from the nose 11 to a distal end of the seat 13. Most seats have two parallel rails 16-17 that the seat-post clamps to.

Figure 1:
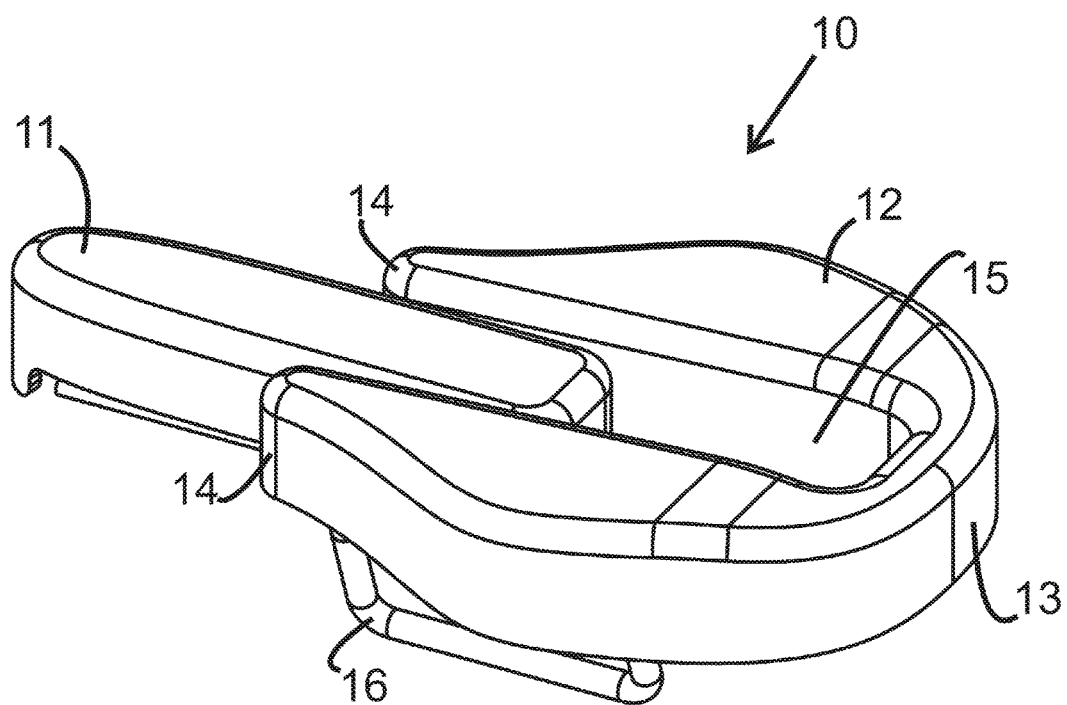
FIG. 1 shows a perspective view of a bike saddle of the present invention in a performance setting.
Figure 2:
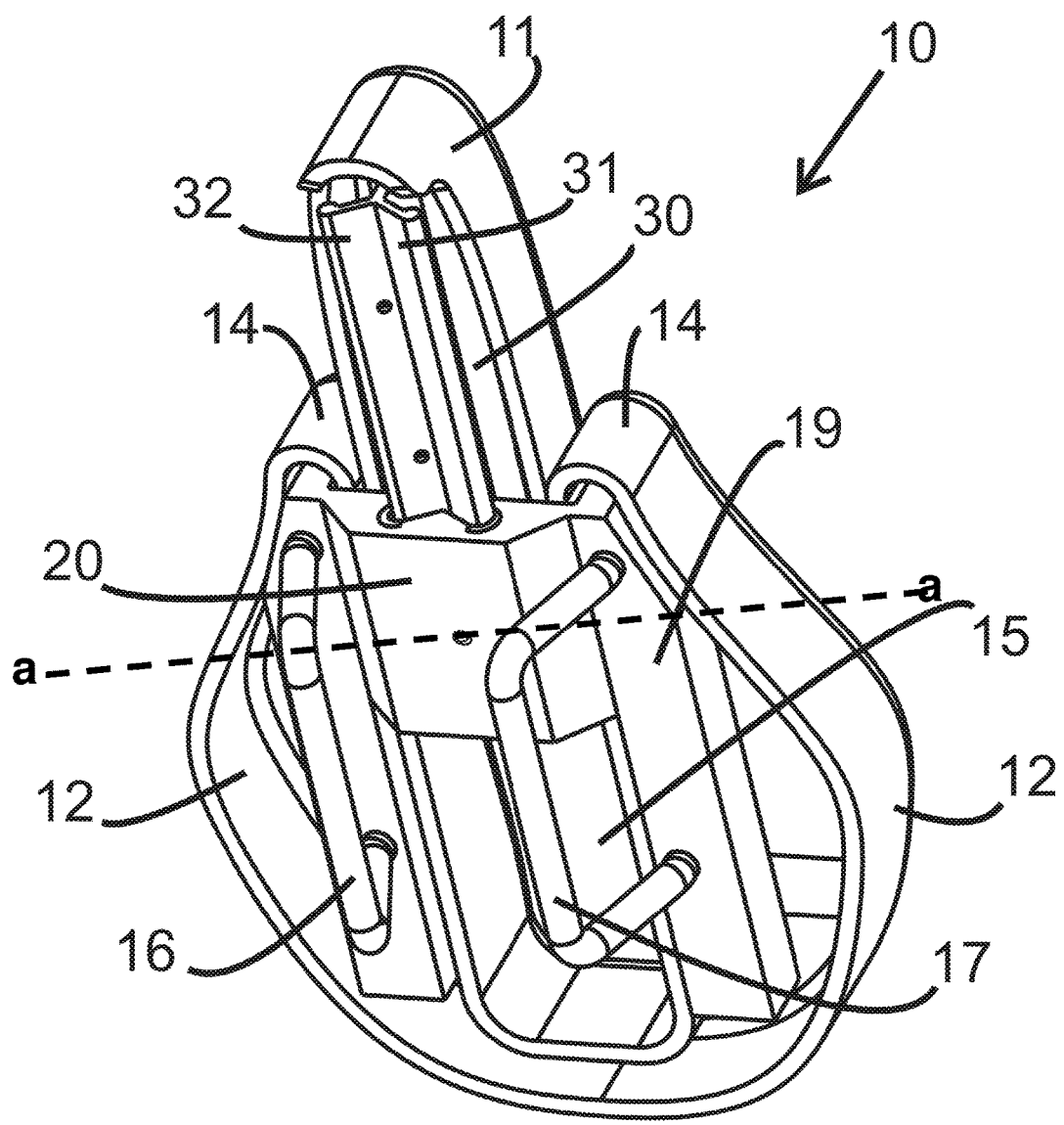
FIG. 2 shows a perspective view of a bike saddle of the present invention from the bottom in a performance setting.
Figure 3:
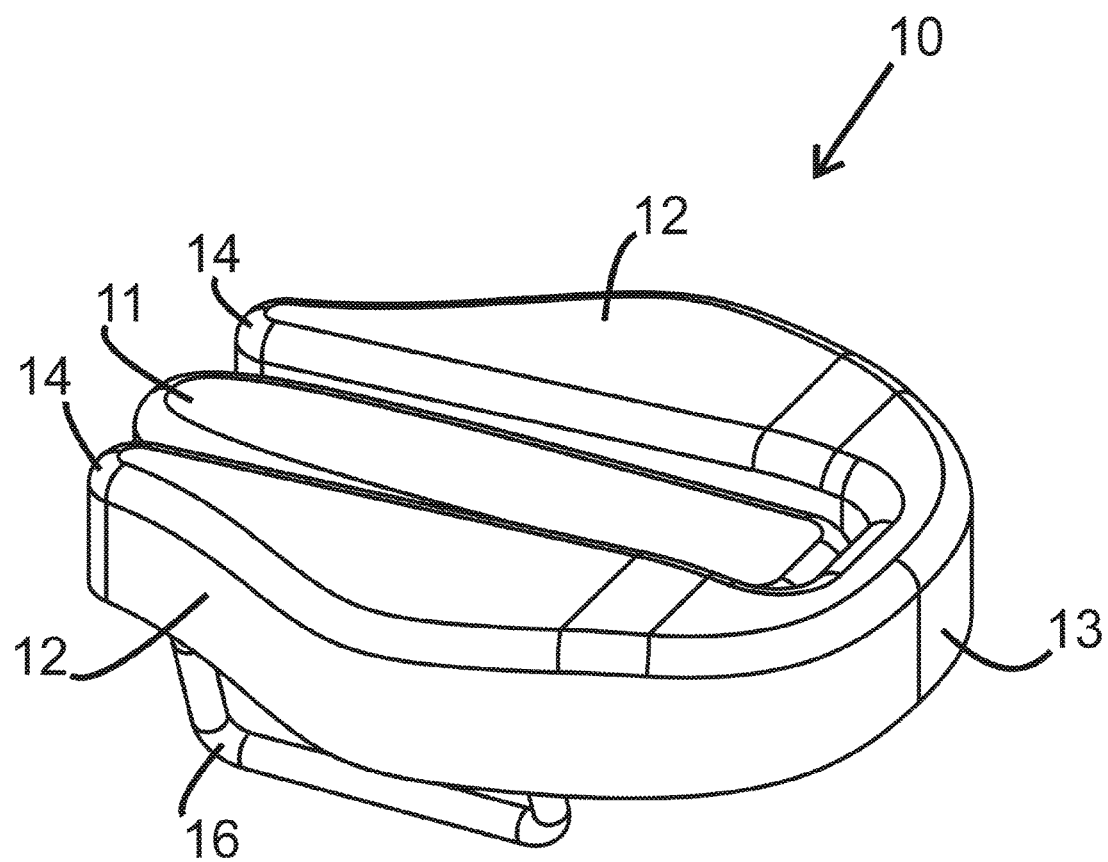
FIG. 3 shows a perspective view of a bike saddle of the present invention in a cruise setting.

FIGS. 1-4 show a bicycle seat 10 with adjustable nose 11. The bicycle seat 10 with an adjustable nose 11 offers an adaptive bicycle seat 10 that allows the rider to adjust the seat nose 11 configurations for optimal comfort, performance, safety and style. The adjustable nose 11 can be slidable inside a body of the bicycle seat 10 to adjust a length of the seat 10 and provides a nose-less seat (FIG. 3).

As shown in FIGS. 1-4, a bicycle seat 10 comprises of an elongated body 12 having a distal 13 and proximal 14 ends, a nose 11 being slidable in a cut-out 15 of the body 12, a sliding track system 20 that allows a rider to adjust the seat nose length for various riding conditions, and a pair of seat rails 16-17 to connect the bicycle seat 10 to the seat-post of a bicycle.

As shown in FIG. 2, a key feature of the adjustable seat nose 11 is a sliding track system 20 that allows the rider to adjust the seat nose length for various riding conditions. The seat nose 11 comprises an inner support frame system 30 that runs the full length of the nose 11 and includes a track insertion component 31-32 on the underside of the nose 11 that are received by a corresponding track system 20 built into a sit-pad frame 19. The sit-pad frame 19 is fully integrated with the track system 20.

Figure 5:
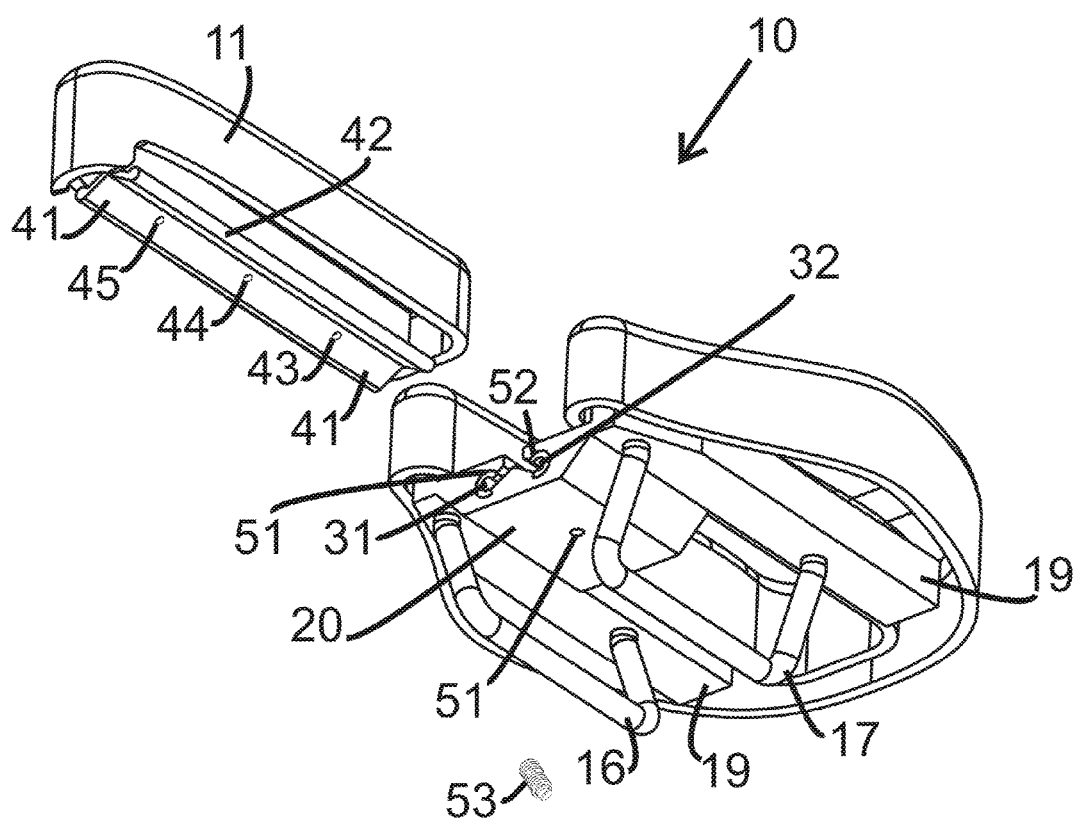
FIG. 5 shows a perspective view of a bike saddle of the present invention from the bottom with a separate nose and a body.
Figure 6:
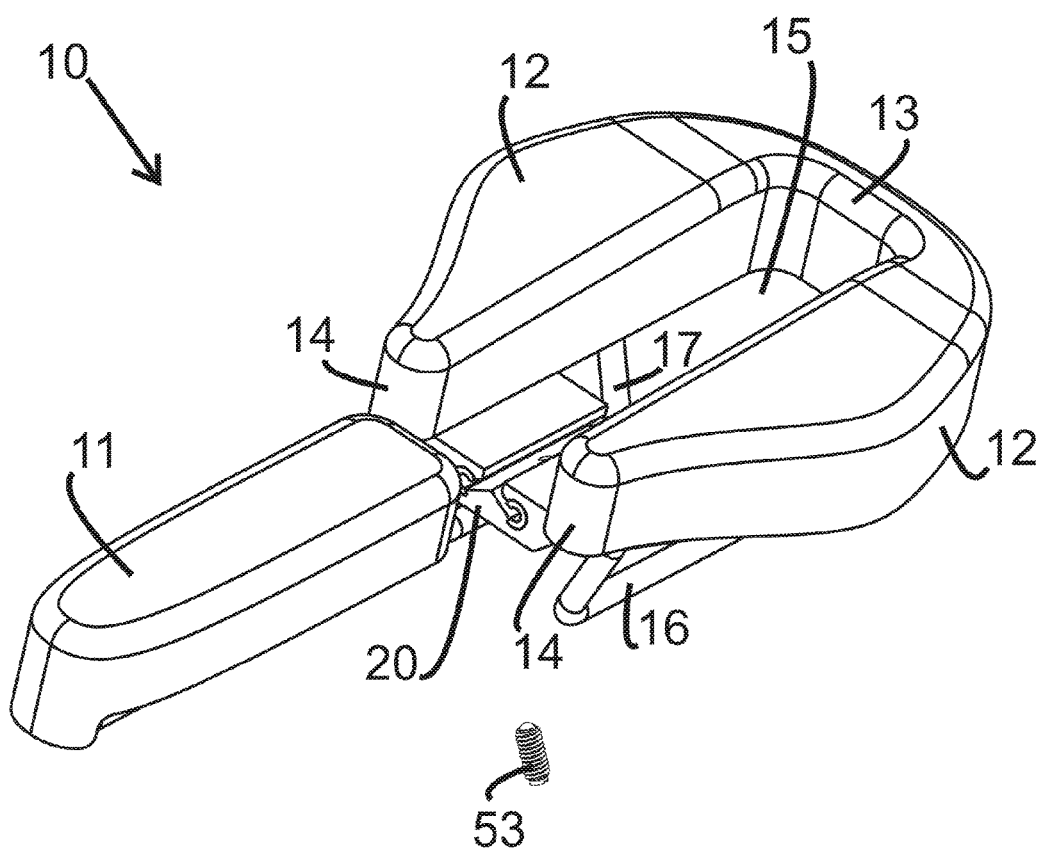
FIG. 6 shows a perspective view of a bike saddle of the present invention from the top with a separate nose and a body.

As shown in FIGS. 5-6, the two grooved portions 31-32 are symmetrical and sized to receive the two rail portions 41-42 designed at the bottom of the seat nose 11. The two rail portions 41-42 being designed form a distal end of the seat nose 11 to the proximal end of the seat nose 11. The two rail portion further has a plurality of holes 43-45 to adjust the length of the seat nose on the two grooved portions 31-32. A hole 51 designed on the track system 20 with the aid of a ball plunger 52 secures the seat nose 11 in a proper position to provide a different length for the seat nose 11. Two plastic sleeves 51, 52 are placed inside two grooved portions 31-32, for enhancing the movement of two rail portions 41-42 inside the two grooved portions 31-32.

By having a ball plunger 52 in the design of the bicycle seat 10, the rider can adjust the length of the nose seat 11 during a ride without having to stop the bicycle and without the need of having specific tools to adjust the nose seat 11.

Figure 7:
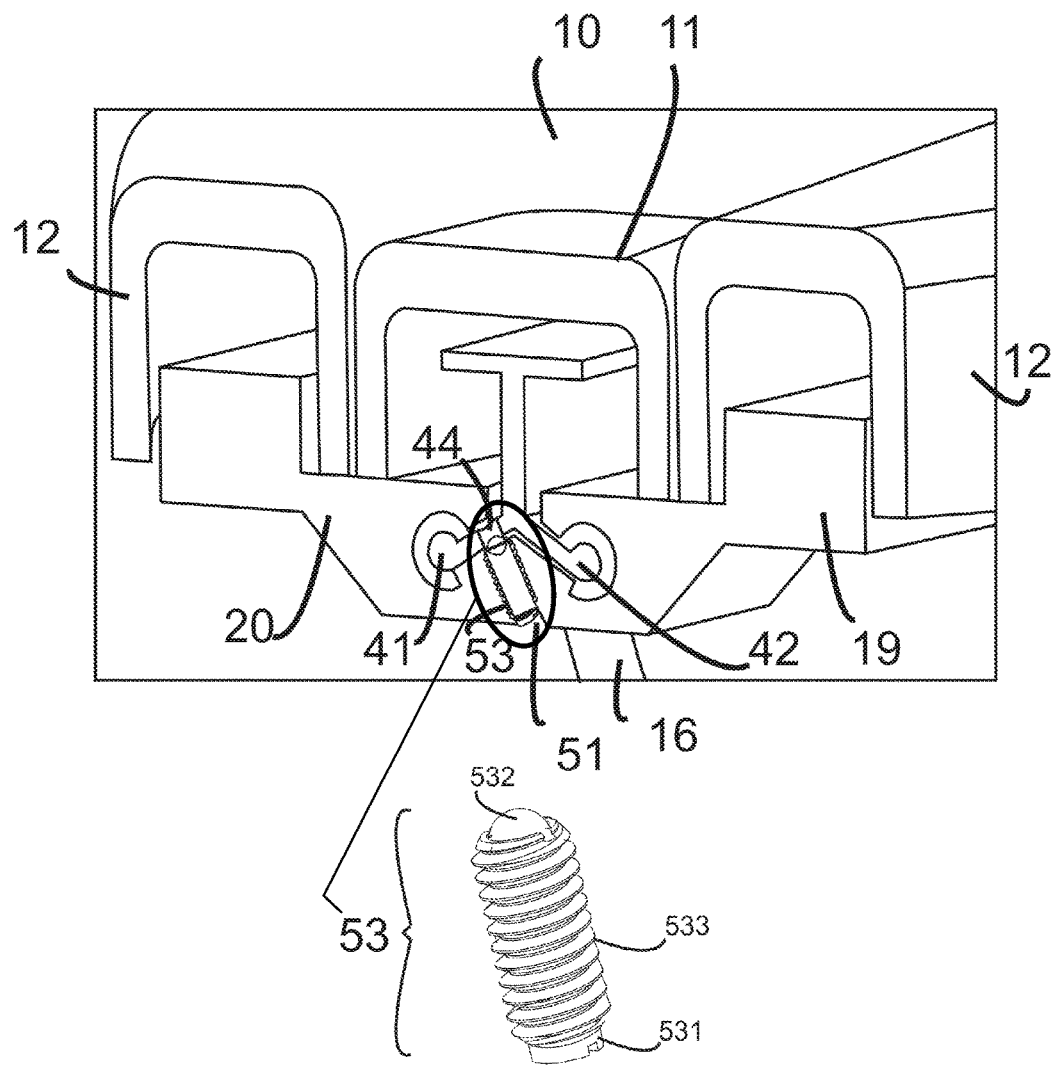
FIG. 7 shows a sectional view of a bike saddle of the present invention through line a-a of FIG. 2.

As shown in FIG. 7, the locking means in the bicycle seat 10 is a ball plunger 53. The ball plunger 53 has a body case 531, a plunger pin 532 protruding from the body case 531 equipped with a coil spring (not shown) inside the body case 531, and a threaded wall 533, wherein the plunger pin 532 is engaged with the apertures 43-45 in the rail portion 41 of the seat-nose 11.

Preferably, the seat-pad frame 19 is formed by a forged aluminum material and the nose rails 41-42 are formed by extruded aluminum.

Figure 4:
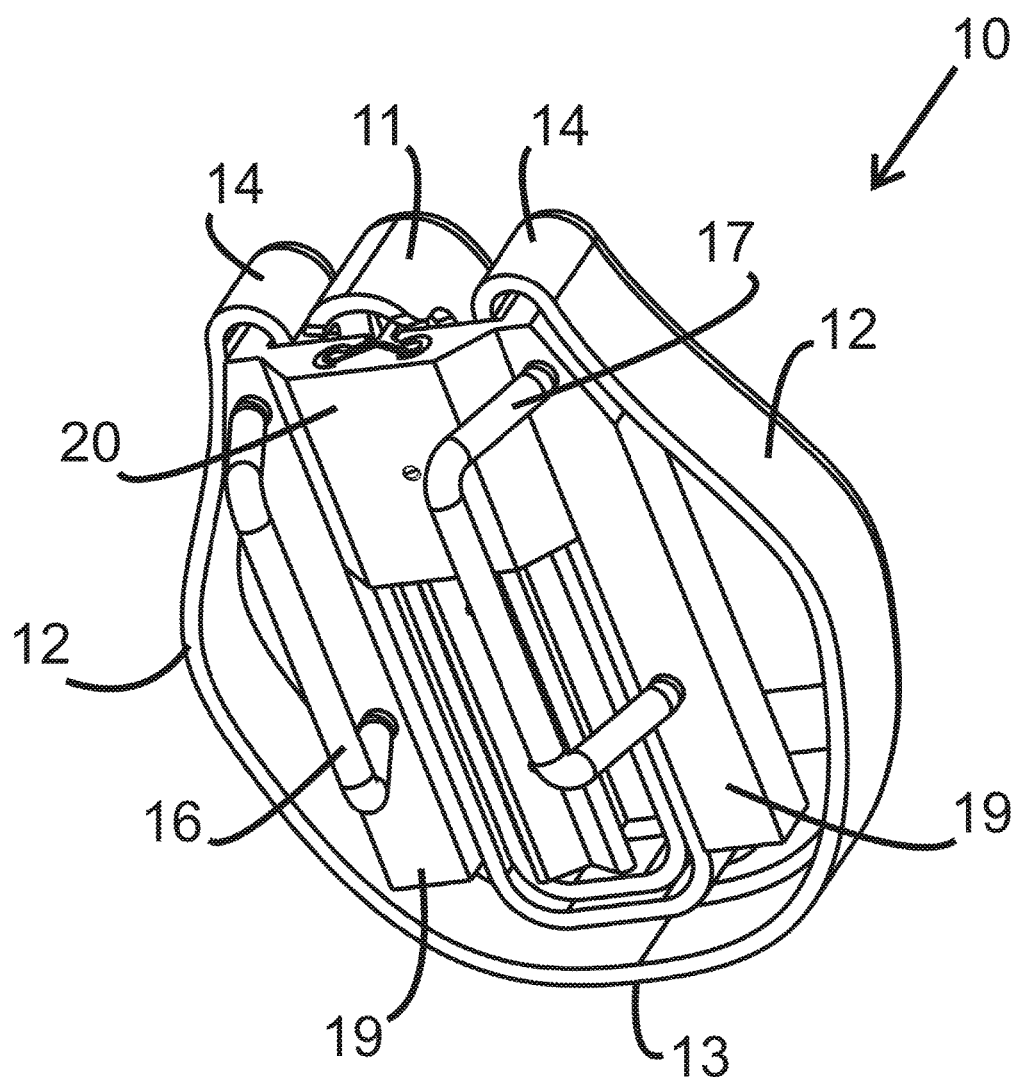
FIG. 4 shows a perspective view of a bike saddle of the present invention from the bottom in a cruise setting.

As shown in FIGS. 3-4, the cruise setting in the present invention does not have a nose during riding for optimal comfort and zero contact with pudendal arteries, prostate and tailbone. It is ideal for cruising, touring or taking a break from the performance mode without having to pause or stop when riding.

As shown in FIGS. 1-2, the performance setting in the present invention has the pull nose extended out so a rider is able to engage with it for performance riding and use it aggressive turning, racing or trail riding. A cut-away slot and ⅜" seat pad elevation minimizes soft tissue pressure.

Figure 8:
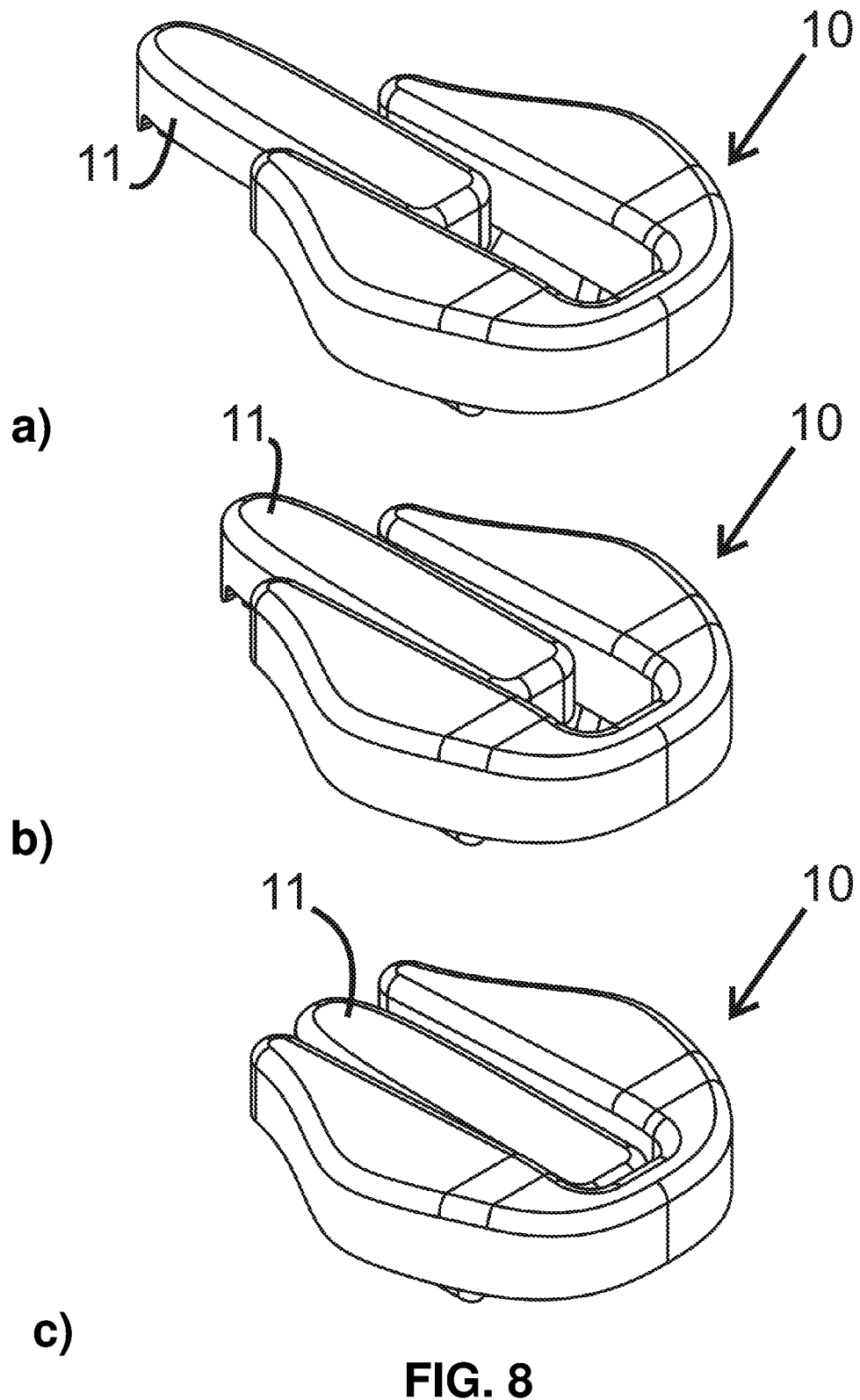
FIG. 8(a-c) show perspective views of three bike saddle of the present invention from the top with three nose lengths.

As shown in FIG. 8(a-c), riders also have the option of partially engaging the nose 11 by selecting one of three nose lengths that are auto-set by pushing the nose in or out to activate a pressure sensitive click and lock system. The nose 11 can be adjusted and locked into one of three positions:

(1) Fully engaged—maximum length, FIG. 8(a);

(2) Mid-range—half length, FIG. 8(b); and (3) Fully recessed—all the way inside the seat (cruise setting), FIG. 8(c). The rider pushes the nose 11 in or out to activate a pressure sensitive click and lock ball plunger system.

Figure 9:
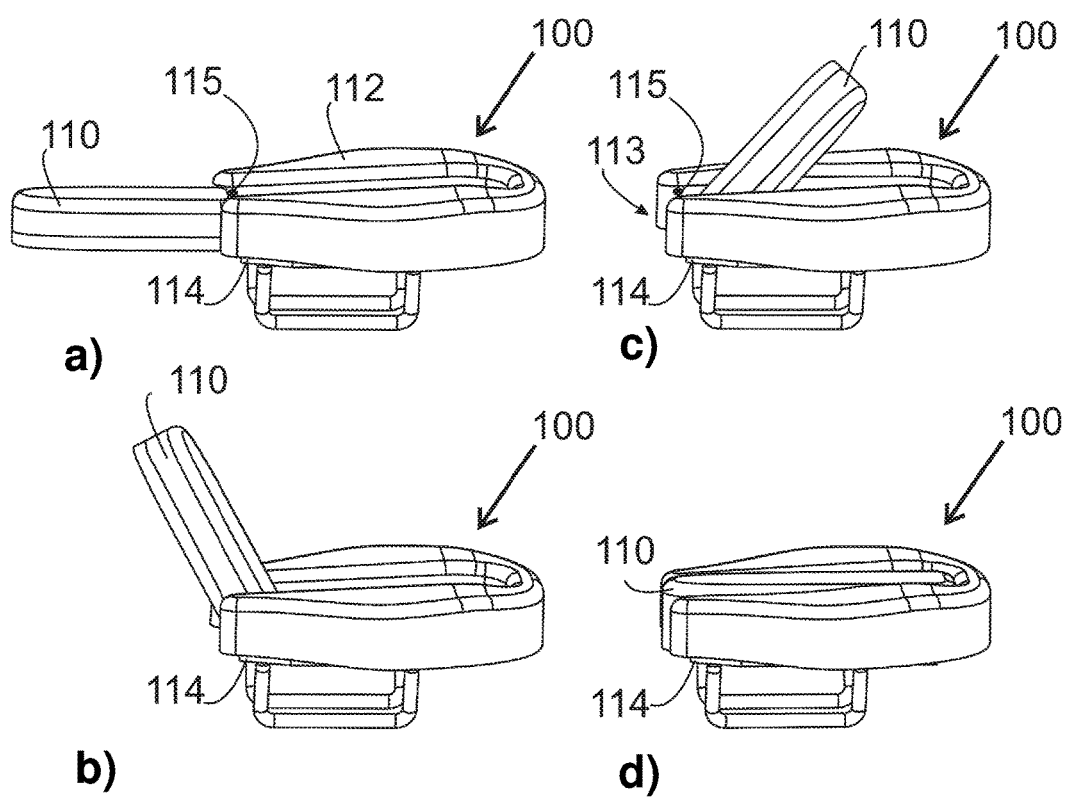
FIG. 9(a-d) show perspective views of a bike saddle of the present invention having different mechanism for adjusting a nose length.

Another embodiment of the present invention is shown in FIG. 9(a-d), a bicycle seat 100 with adjustable nose 110 offers an adaptive bicycle seat that allows the rider to adjust seat nose 110 configurations for optimal comfort, performance, safety and style in another mechanism for adjusting the nose 110. The bicycle seat 100 has a pivot design in which a nose 110 pivots up and out from seat center or flips up from under seat. The steps of adjusting a seat nose 110 are shown in FIG. 9(a-d). The pivot design may require the rider to get off bicycle to flip out and back in.

As shown again in FIG. 9(a-d), the pivotable nose bicycle seat 100 comprising of a nose-less seat shell 112 having a central opening 113; a pivotable nose 110 pivots inside said opening 113; a sit-pad frame 114 to support the seat 100; and a pivot point 115, whereby the length of the pivotable nose 110 is changed by pivoting the pivotable nose 110 around the pivot point 115, extending the length of the pivotable nose 110 for aggressive turning, racing or trail riding and reducing the length of the pivotable nose 110 when cruising for comfort and zero contact with pudendal arteries, prostate and tailbone of a rider.

The pivotable nose 110 pivots around pivot point 115 by helps of a pivoting rod. The pivoting rod comprises of two parts, a cylindrical portion and a rectangular portion. The pivotable nose 110 pivots around pivot point 115 by pulling the nose into the cylindrical portion and lock the nose in the rectangular portion.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. An extendable nose bicycle seat comprising:
    a. a nose-less seat having a central opening;
    b. a slidable nose slidable inside said central opening;
    c. a sit-pad frame to support said nose-less seat;
    d. a rail system attached to the underside of said slidable nose, said rail system having a plurality of apertures;
    e. a sliding track system attached to said sit-pad frame to receive and slide said rail system;
    f. a releasable ball plunger attached to said slidable track to secure said slidable nose at different said plurality of apertures of said rail system, whereby the length of the slidable nose can be changed by a rider while riding, extending the length of the slidable nose for aggressive turning, racing or trail riding and reducing the length of the slidable nose when cruising for comfort and zero contact with pudendal arteries, prostate and tailbone of a rider;
    h. a plurality of seat-rails attached to said sit-pad frame to connect said nose-less seat to a seat-post.

2. The extendable nose bicycle seat of claim 1, wherein said ball plunger having a casing, a plunger pin protruding from said casing equipped with a coil spring inside said casing, and a threaded wall, wherein said plunger pin is engaged with said apertures in said rail system of said nose.

3. The extendable nose bicycle seat of claim 1, wherein said rail system is a pair of rails, and said sliding track system is a pair of symmetrical grooved portions sized to receive said pair of rails.

4. The extendable nose bicycle seat of claim 3, wherein said grooved portion further having a plastic sleeve sized and placed inside said grooved portions to reduce friction for ease of movement of said rail portions.

5. The extendable nose bicycle seat of claim 1, wherein said rail system having at least three apertures to have a maximum length, a half-length or a fully recessed bicycle seat nose.

6. The extendable nose bicycle seat of claim 1, wherein said seat shell having a right and a left front lip designed to provide smooth transitional contour to said nose.

* * * * *